US011790953B2

(12) United States Patent
Li

(10) Patent No.: US 11,790,953 B2
(45) Date of Patent: *Oct. 17, 2023

(54) SMART SUMMARIZATION, INDEXING, AND POST-PROCESSING FOR RECORDED DOCUMENT PRESENTATION

(71) Applicant: Microsoft Technology Licensing, LLC, Redmond, WA (US)

(72) Inventor: Ji Li, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/868,461

(22) Filed: Jul. 19, 2022

(65) Prior Publication Data

US 2022/0415366 A1  Dec. 29, 2022

Related U.S. Application Data

(63) Continuation of application No. 17/355,634, filed on Jun. 23, 2021, now Pat. No. 11,532,333.

(51) Int. Cl.
*G06F 3/0482* (2013.01)
*G11B 27/10* (2006.01)
(Continued)

(52) U.S. Cl.
CPC .......... *G11B 27/102* (2013.01); *G06F 3/0482* (2013.01); *G06F 16/43* (2019.01);
(Continued)

(58) Field of Classification Search
CPC ..... G11B 27/102; G06F 16/43; G06F 40/134; G06F 40/279; G06F 3/0482; G06F 18/21;
(Continued)

(56) References Cited

U.S. PATENT DOCUMENTS 7,730,407 B2 * 6/2010 Chiu .................. G11B 27/34
715/721
10,977,258 B1 * 4/2021 Liu .................... G10L 15/26
(Continued)

FOREIGN PATENT DOCUMENTS

AU   2014233499 A1 * 11/2015 ............. G06F 16/22
CA    2893960 A1 *  6/2014 ........... G06F 16/335
(Continued)

OTHER PUBLICATIONS

"International Search Report & Written Opinion issued in PCT Application No. PCT/US22/029503", dated Jul. 15, 2022, 13 Pages.
U.S. Appl. No. 17/355,634, filed Jun. 23, 2021.

*Primary Examiner* — Steven P Sax
(74) *Attorney, Agent, or Firm* — Schwegman Lundberg & Woessner, P.A.

(57) ABSTRACT

Systems and methods for providing summarization, indexing, and post-processing of a recorded document presentation are provided. The system accesses a structured document and recordings associated with a recorded presentation given using the structured document. The system analyzes, using machine-trained models, the structured document, audio and video recordings, and recording of operations performed during the presentation. The analyzing comprises generating a transcript of the audio recording, determining context of components of the structured document, and deriving context from the video recordings and recording of operations. Based on the analyzing, the system segments the recorded presentation into a plurality of segments and generates an index of the plurality of segments that is used for post-processing.

20 Claims, 9 Drawing Sheets

(51) Int. Cl.

| | |
|---|---|
| *G06F 16/43* | (2019.01) |
| *G06N 20/00* | (2019.01) |
| *G06F 40/134* | (2020.01) |
| *G06F 40/279* | (2020.01) |
| *G06V 30/413* | (2022.01) |
| *G06V 20/40* | (2022.01) |
| *G10L 15/22* | (2006.01) |
| *G10L 15/26* | (2006.01) |
| *G10L 25/57* | (2013.01) |
| *G06F 18/21* | (2023.01) |
| *G06V 30/414* | (2022.01) |
| *G06V 10/24* | (2022.01) |

(52) U.S. Cl.
CPC ............ *G06F 18/21* (2023.01); *G06F 40/134* (2020.01); *G06F 40/279* (2020.01); *G06N 20/00* (2019.01); *G06V 20/47* (2022.01); *G06V 20/49* (2022.01); *G06V 30/413* (2022.01); *G10L 15/22* (2013.01); *G10L 15/26* (2013.01); *G10L 25/57* (2013.01); *G06V 10/245* (2022.01); *G06V 30/414* (2022.01)

(58) Field of Classification Search
CPC .. G06F 3/04812; G06F 3/0483; G06F 3/0484; G06F 3/0488; G06F 16/743; G06F 16/748; G06F 16/745; G06N 20/00; G06V 30/413; G06V 20/49; G06V 20/47; G06V 30/414; G06V 10/245; G10L 15/22; G10L 15/26; G10L 25/57; H04M 1/72439; H04N 1/00161
See application file for complete search history.

(56) References Cited

U.S. PATENT DOCUMENTS

| | | | | |
|---|---|---|---|---|
| 11,023,737 | B2* | 6/2021 | Li | G06F 18/23 |
| 11,057,635 | B2* | 7/2021 | Xiang | G06T 7/20 |
| 11,126,682 | B1* | 9/2021 | Silverstein | G06F 16/4393 |
| 2008/0300872 | A1* | 12/2008 | Basu | G06F 16/7844 |
| | | | | 704/235 |
| 2012/0099793 | A1* | 4/2012 | Kumar | G11B 27/034 |
| | | | | 382/190 |
| 2013/0097644 | A1* | 4/2013 | Brande | H04N 21/8586 |
| | | | | 725/93 |
| 2013/0311181 | A1* | 11/2013 | Bachtiger | G06F 16/345 |
| | | | | 704/235 |
| 2014/0222834 | A1* | 8/2014 | Parikh | G06F 16/9535 |
| | | | | 707/748 |
| 2015/0170325 | A1* | 6/2015 | Abecassis | H04N 21/4542 |
| | | | | 345/2.1 |
| 2016/0014482 | A1* | 1/2016 | Chen | H04N 21/8456 |
| | | | | 386/241 |
| 2016/0080485 | A1* | 3/2016 | Hamedi | G06Q 50/01 |
| | | | | 709/204 |
| 2018/0359530 | A1* | 12/2018 | Marlow | G06F 16/783 |
| 2019/0034976 | A1* | 1/2019 | Hamedi | G06Q 30/0243 |
| 2019/0043533 | A1* | 2/2019 | Srinivasan | G06V 20/41 |
| 2020/0372066 | A1 | 11/2020 | Saggi et al. | |
| 2021/0065569 | A1* | 3/2021 | Arvindam | G06F 40/30 |
| 2021/0076105 | A1 | 3/2021 | Parmar et al. | |
| 2021/0255759 | A1* | 8/2021 | Farrell | G06F 3/0481 |

FOREIGN PATENT DOCUMENTS

| | | | | |
|---|---|---|---|---|
| CA | 3037201 | A1* | 3/2018 | ........... G06F 16/783 |
| CA | 3104549 | A1* | 12/2019 | ............. G02B 30/52 |
| CA | 3090676 | A1* | 2/2021 | ......... G06Q 10/1095 |
| CA | 3090981 | A1* | 2/2021 | ........... G06Q 10/103 |
| WO | 2017124116 | A1 | 7/2017 | |
| WO | WO-2021168160 | A1* | 8/2021 | ............. G11B 27/00 |

* cited by examiner

SMART SUMMARIZATION, INDEXING, AND POST-PROCESSING FOR RECORDED DOCUMENT PRESENTATION

CROSS-REFERENCE TO RELATED APPLICATION

This application is a continutation of U.S. application Ser. No. 17/355,634 filed Jun. 23, 2021, which application is incorporated herein by reference in its entirety.

TECHNICAL FIELD

The subject matter disclosed herein generally relates to document presentations. Specifically, the present disclosure addresses systems and methods that provide summarization, indexing, and post-processing of recorded document presentations.

BACKGROUND

Conventionally, a recording of a document presentation comprises a plurality of slides and audio of a user that is presenting the plurality of slides. When a viewer wants to later view the recorded presentation, the user typically needs to view the entire recorded presentation or fast forward to portions that they are interested in. There is no quick or easy way for the viewer to navigate to the portion that they are interested in nor is there any automatically generated summarization of the recorded document that can provide highlights of the different portions of the recorded document.

BRIEF DESCRIPTION OF THE DRAWINGS

Some embodiments are illustrated by way of example and not limitation in the figures of the accompanying drawings.

DETAILED DESCRIPTION

Figure 1:
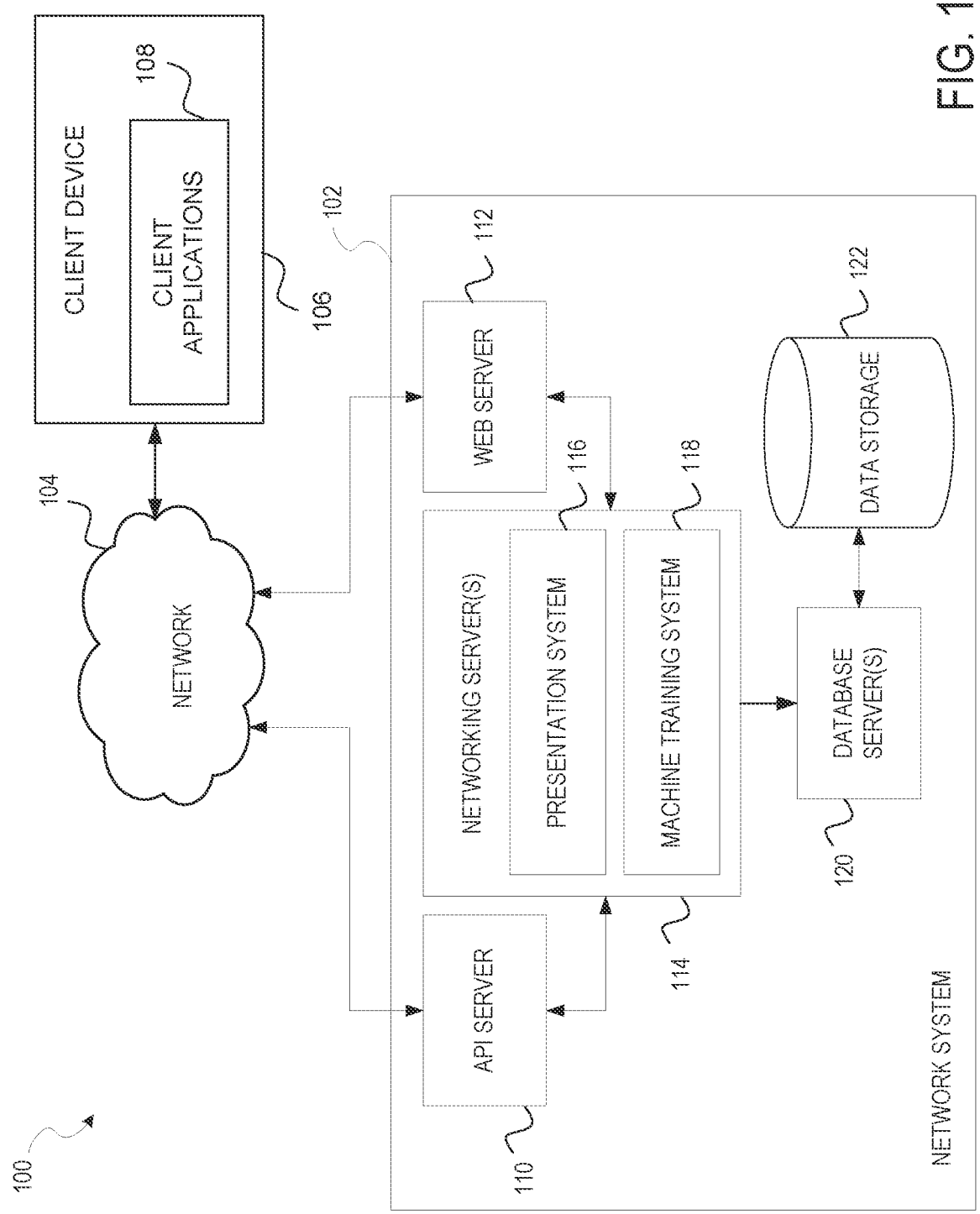
FIG. 1 is a diagram illustrating a network environment suitable for providing a smart summarization, indexing, and post-processing system for recorded presentations, in accordance with example embodiments, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Document presentation recording is a fast-growing feature in presentation software, such as PowerPoint. With the recorded presentation, later viewers can access the recorded presentation at anytime and from anywhere. This can be especially useful for teams to recap the recorded presentation and for students to review lecture recordings involving documents (e.g., whiteboards, slides). However, the number of recordings will grow to a point where it will be difficult to find a specific recording for a specific topic. Moreover, some recordings may be long and a viewer may only want to view a specific portion of a recording. In these cases, example embodiments use summarization technology to automatically generate key points of the recorded presentation and provide navigation (e.g., links) to specific segments of the recorded presentation associated with the key points.

Unlike general presentations/video summarization applications, example embodiments also include document information from structured documents, such as, slide presentations (e.g., PowerPoint presentations), written documents (e.g., Word documents), spreadsheets or workbooks (e.g., Excel documents), and/or drawings (e.g., Visio drawings). While viewers can read these documents by themselves, a recorded presentation (e.g., a recording of a user presenting the document information) may be a better approach to clearly explain content of the document.

Example embodiments analyze, summarize, and post-process a recorded presentation including a structured document in such a way that the information can be leveraged by downstream applications to provide quick and easy access to particular segments of the recorded presentation. In example embodiments, a system utilizes machine-trained (i.e., using machine-learning) models to summarize, index, and post-process a recorded (document) presentation. The machine training involves training different models that analyze text in slides, slide structures, images in slides, operations performed during the presentation, recorded audio, and recorded video. These models are then used to analyze a recorded presentation, which results in a plurality of outputs including a parsed document, document understanding/context, recording operation understanding/context, a transcript, and camera stream understanding/context. These results are then processed by an index and summarization system which creates segments of the recorded presentation, summarizes the recorded presentation, extracts keywords which can be linked to segments of the presentation, and crops and aligns the segments with summarization and keywords.

Subsequently, a viewer accesses the recorded presentation and can view all or selected segments of the recorded presentation. In example embodiments, the recorded presentation provides a summarization of the recorded presentation, whereby each segment corresponds to a topic of the summarization. Additionally, keywords can be presented on a user interface or portal presenting the recorded presentation (e.g., below the recorded presentation). A selection of a keyword can, in one embodiment, navigate the recorded presentation to a segment that is linked to the selected keyword. Additionally, the system can compose mails and/or posts that can provide a summarization of a recorded presentation and/or access to one or more segments of the recorded presentation. This allows a recipient of an email or viewer of a post to quickly access specific segments of the recorded presentation.

Thus, example embodiments provide smart summarization, indexing, and post-processing of recorded document presentations that allow, for example, a user to quickly find and access segments of the recorded presentation. Example embodiments utilize a plurality of machine-trained models to analyze a structured document (e.g., a slide presentation) and corresponding recordings associated with the presentation of the structured document. The corresponding recordings can include one or more of audio tracks, camera streams, and operations performed during the recorded presentation (e.g., mouse and laser pointer movements, writing/drawings on a slide or document page). Based on the analysis, the example embodiments can segment the recorded presentation (e.g., by topic), link keywords and topics to each segment, and provide a summary of the entire recorded presentation.

Advantageously, example embodiments generate a summary and index for each recorded presentation using machine-trained models. Accordingly, the present disclosure provides technical solutions that automatically, without human intervention, generates these summaries and indexes, which can be used by post-process applications for further processes including providing quick search and access to one or more segments of the recorded presentation. As a result, one or more of the methodologies described herein facilitate solving the technical problem of summarizing, indexing, and post-posting recorded presentations. The result allows users to efficiently access segments of recorded presentations without undue searching or having to fast forward through an entire recorded presentation. As such, one or more of the methodologies described herein may obviate a need for certain efforts or computing resources that otherwise would be involved in repeatedly searching for and viewing segments of a recorded presentation in order to find a particular topic of interest. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagram illustrating a network environment 100 suitable for providing a smart summarization, indexing, and post-processing system for recorded presentations using structured documents, in accordance with example embodiments. A network system 102 provides server-side functionality via a communication network 104 (e.g., the Internet, wireless network, cellular network, or a Wide Area Network (WAN)) to a client device 106 that includes a client application 108. In example embodiments, the network system 102 trains and uses machine learning models to analyze a structure document and recordings associated with a document presentation (i.e., the recorded presentation). The structured document comprises a document that is presented during the recorded presentation, such as a slide presentation, spreadsheet, or text document. The recordings comprise, for example, an audio track, a camera stream, and/or other inputs such as mouse movement, laser pointer indications, and pen movement (e.g., written text during the presentation). The analysis is then used to segment, summarize, and index the segments for quick and easy access by subsequent viewers and for use by other applications.

In example embodiments, the client device 106 is a device of a user of the network system 102 that wants to create or view a recorded presentation. The client device 106 includes the client applications 108 which can be used to generate the structured document and/or the recorded presentation. In some embodiments, the client applications also comprise a presentation processing system (or a portion of the presentation processing system) that can apply the machine trained models to the recorded presentation to summarize, segment, and index the recorded presentation. The client application 108 may also perform a portion of the post-processing of the recorded presentation. The presentation processing system will be discussed in more detail below in connection with FIG. 3.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an embodiment, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that can access the network system 102. In some embodiments, the client device 106 comprises a display module (not shown) to display information (e.g., in the form of user interfaces).

Turning specifically to the network system 102, an application programing interface (API) server 110 and a web server 112 are coupled to, and provide programmatic and web interfaces respectively to, one or more networking servers 114. The networking server(s) 114 host a presentation system 116 and a machine training system 118, each of which comprises a plurality of components, and which can be embodied as hardware, software, firmware, or any combination thereof. In some embodiments, the presentation system 116 comprises a cloud-based version of an application that allows a user (e.g., a presenter) to generate and record a document presentation. Additionally, the presentation system 116 may comprise all or a portion of the presentation processing system that will be discussed in more detail in connection with FIG. 3.

The machine training system 118 trains the models used by the presentation processing system. For example, a first model may be a text analysis model that analyzes text in a slide to determine context, while a second model is a slide analysis model that analyzes a structure of a slide (e.g., shape and location of objects, number of bullets), and a third model is an image analysis model that analyzes images within the document (e.g., text boxes, tables, graphs) and align it with content. In example embodiments, the machine training system 118 takes as input, previously analyzed data corresponding to each of these models being trained. The machine training system 118 may also receive feedback from users that have viewed recorded presentations and retrains the models based on the feedback.

The networking servers 114 are, in turn, coupled to one or more database servers 120 that facilitate access to one or more information storage repositories or data storage 122. In some embodiments, the data storage 122 is a storage device storing recorded presentations and feedback.

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 9, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of client devices 106 may be embodied within the network environment 100. While only a single network system 102 is shown, alternative embodiments contemplate having more than one network system 102 to perform server operations discussed herein for the network system 102 (e.g., each localized to a particular region).

Figure 2:
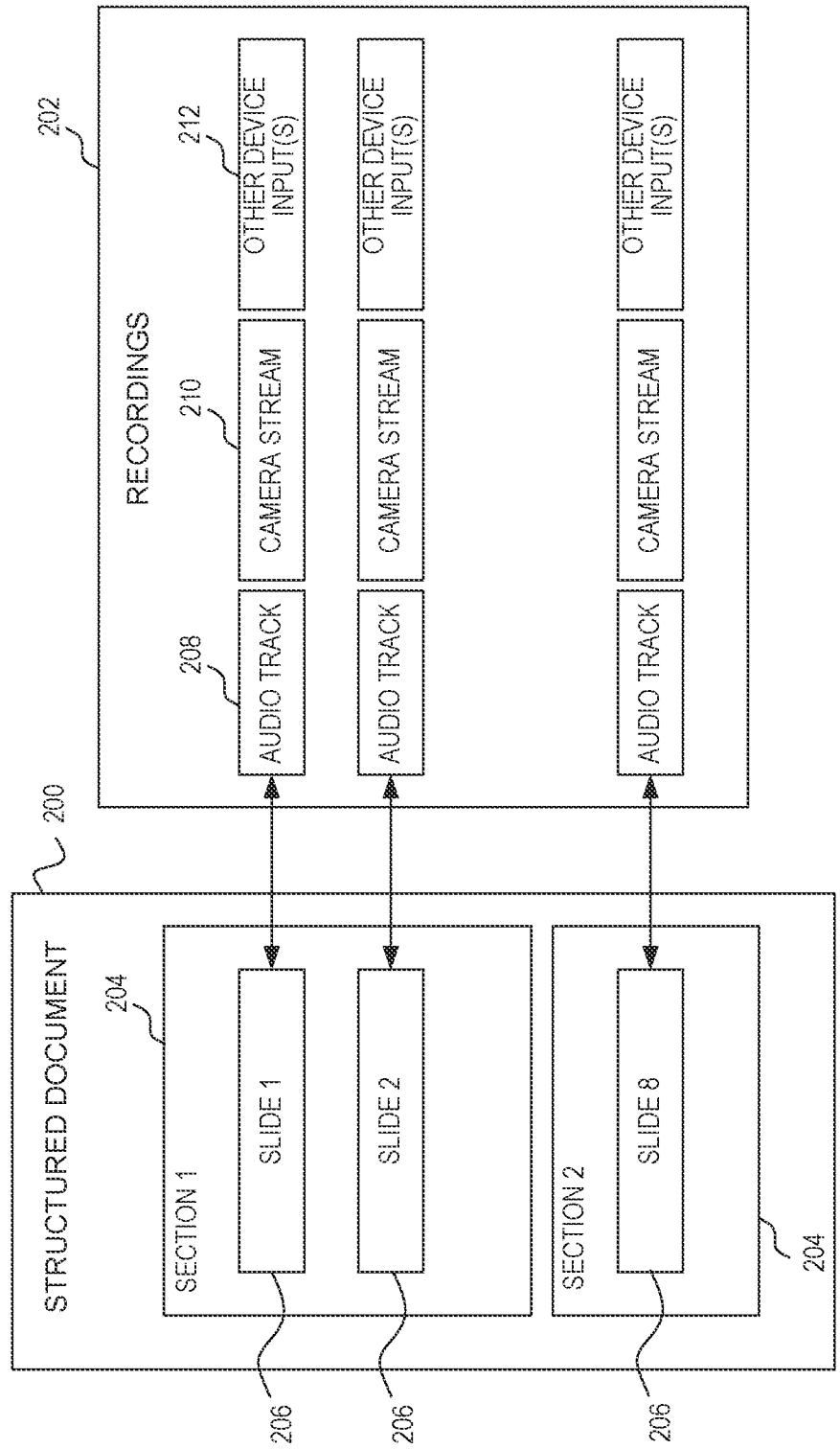
FIG. 2 is a diagram illustrating inputs to a presentation processing system, according to some example embodiments.

FIG. 2 is a diagram illustrating inputs to a presentation processing system, according to some example embodiments. The inputs include a structure document 200 and various recordings 202. The structured document 200 may be a slide presentation (e.g., PowerPoint presentation), a spreadsheet document, text document, or any other type of structured document that a presenter presents in a recorded presentation. For ease of discussion, example embodiments will be discussed using a structured document that is a slide presentation. The structured document 200 can comprise a plurality of sections 204 and different slides 206 (or document pages) within each section 204. In some cases, the presenter indicates the plurality of sections 204 by adding sections when creating the structured document 200. In other embodiments, transition points can be identified by a segmentation/section model (e.g., a machine-trained model).

The recordings 202 include audio track recordings 208, camera stream recordings 210, and other device input or operations recordings 212, such as mouse movement, laser pointer indications, and pen movement (e.g., "ink" from writing/drawing on the structured document 200 during the presentation) on or associated with the structured document 200. Each of these recordings (or portion of the recordings) is aligned with a corresponding part of the structured document 200, such as a corresponding slide 206.

In some embodiments, other information can be used as input to the presentation processing system 300. For example, user history and metadata can be used. The metadata can be used as personalized features to downstream models, which may improve the overall suggestion quality for different users. The user history can indicate preferences and styles of the presenter that can be used to determine context or understanding and which can also be used as features to the downstream models and analysis.

Figure 3:
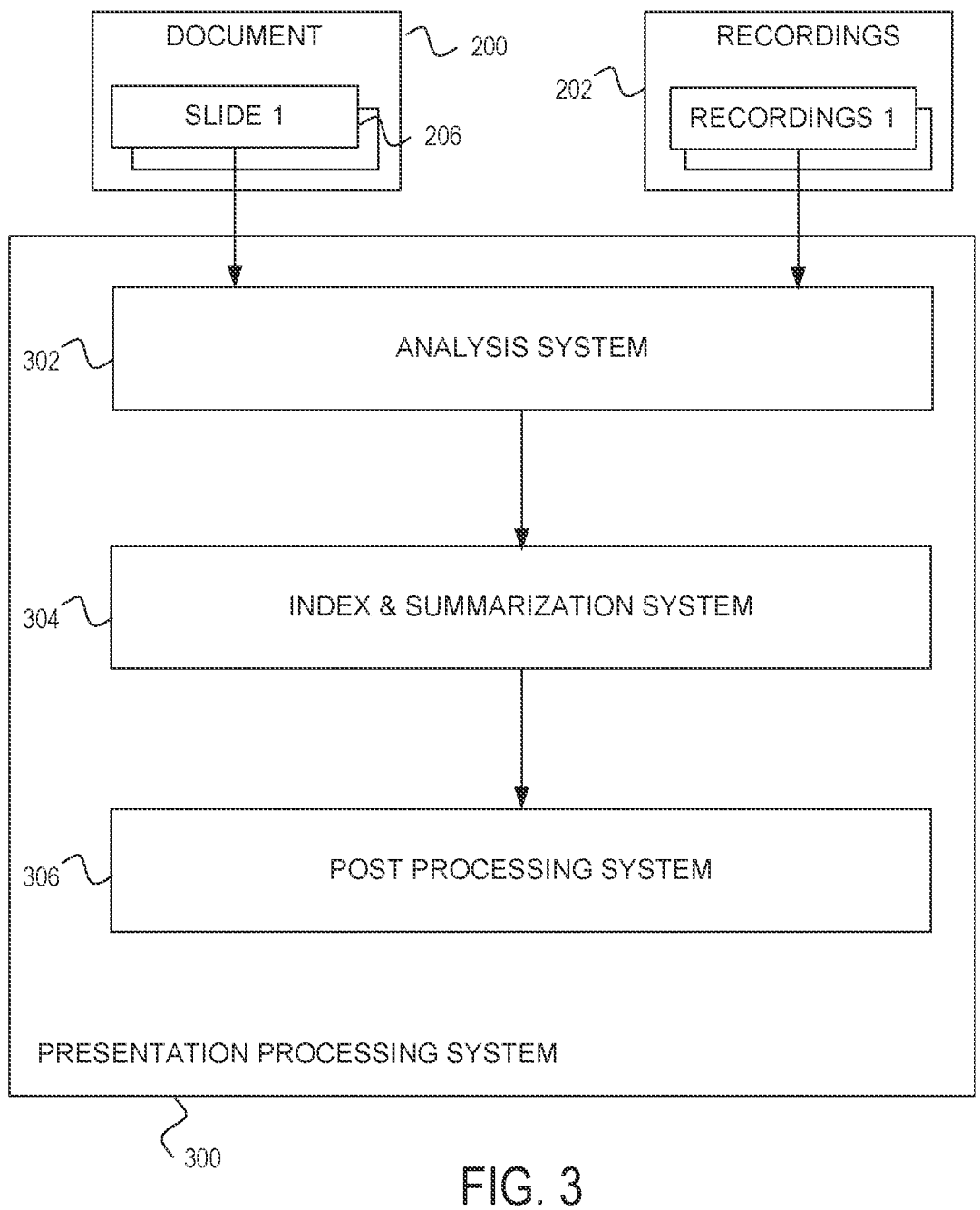
FIG. 3 is a block diagram illustrating components of the presentation processing system, according to some example embodiments.

FIG. 3 is a block diagram illustrating components of the presentation processing system 300, according to some example embodiments. The presentation processing system 300 is configured to analyze the structured document 200 including the slides 206 and any recordings (e.g., corresponding audio track recordings 208, camera stream recordings 210, and/or other device input/operations recordings by applying models (e.g., machined trained models) to summarize, segment, and index the recorded presentation. The presentation processing system may also post-process the summarized, segmented, and indexed recorded presentation. To enable these operations, the presentation processing system 300 comprises an analysis system 302, an index and summarization system 304, and a post-processing system 306.

In some embodiments, the presentation processing system 300 is embodied (wholly or partially) within the presentation system 116 of the network system 102. In other embodiments, the presentation processing system 300 or a portion thereof is embodied at the client device 106 (e.g., as part of a client application 108). As such, some embodiments may have the client device 106 performing some of the operations of the presentation processing system 300 (e.g., video analysis) such that larger files do not need to transmitted to the network system 102 for processing.

In example embodiments, a presenter creates the structured document 200 and records a presentation/discussion of the structured document 200 that can include audio and video of the presenter discussion the structured document 200. In example embodiment, the recorded presentation can then be exported as a video.

The analysis system 302 is configured to perform a general analysis and low-level processing of the structured document 200 and the recordings 202. The output of the analysis system 302 may include a transcript; understanding/context of components within the slides 206 or sections of the structured document 200 including text, images, and document structure; and understanding/context of camera, operations, and/or voice data. The analysis system 302 will be discussed in more detail in connection with FIG. 4 below.

The index and summarization system 304 is configured to perform segmentation, summarization keyword extraction, and cropping and alignment based on the low-level understanding obtained from the analysis system 302. The index and summarization system 204 will be discussed in more detail in connection with FIG. 5 below.

The post-processing system 306 is configured to consume the indexing and summarization performed by the index and summarization system 304 to build applications or for utilization in other applications. The applications can perform, for example, smart recorded presentation search and email template generation (to share the recorded presentation). The post-processing system 306 will be discussed in more detail in connection with FIG. 6 below.

Figure 4:
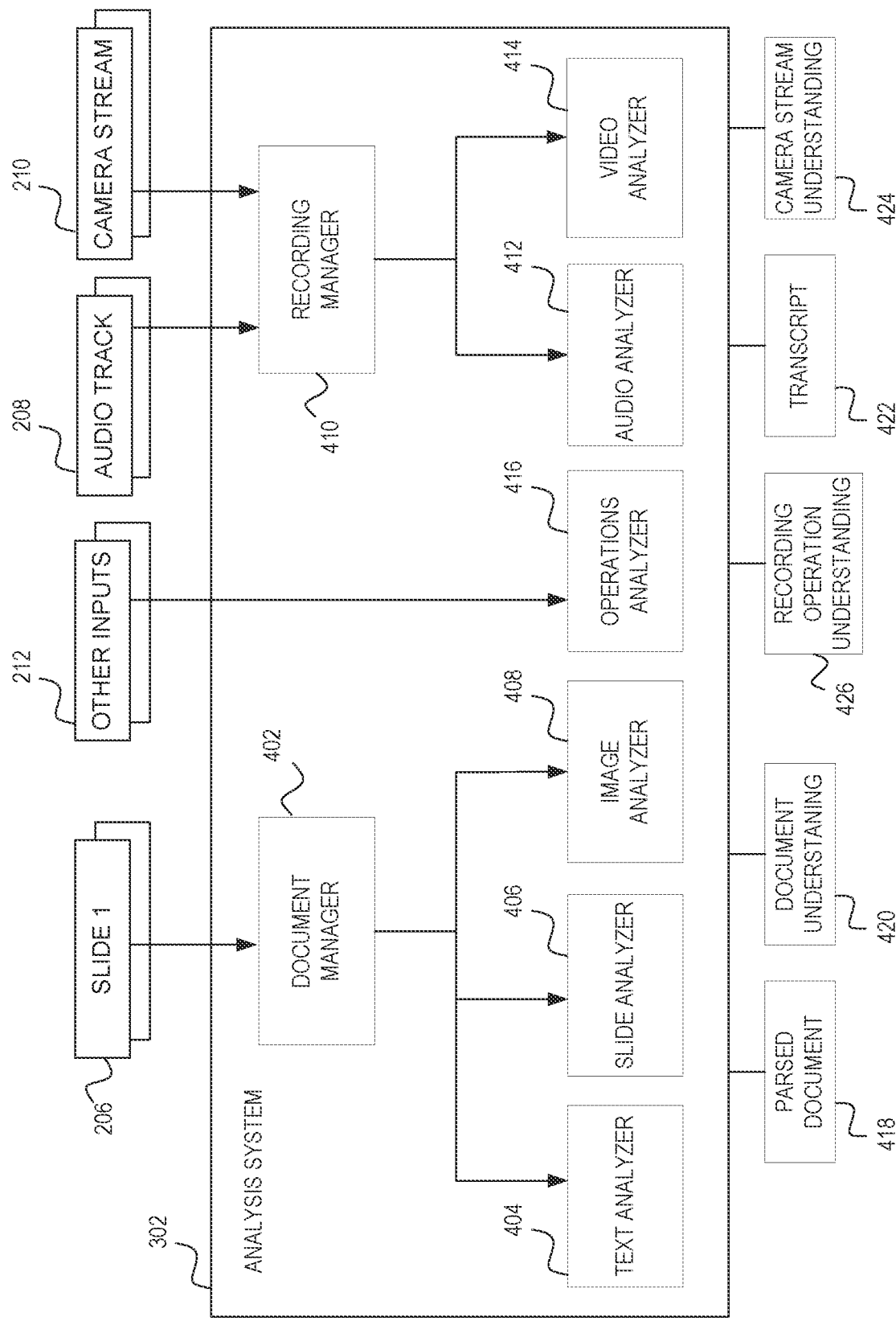
FIG. 4 is a block diagram illustrating components of an analysis system of the presentation processing system including inputs and outputs, according to some example embodiments.

FIG. 4 is a block diagram illustrating components of the analysis system 302 including inputs and outputs, according to some example embodiments. The analysis system 302 comprises the first stage of the presentation processing system 300. This first stage takes raw input (e.g., the structure document 200 and recordings 202) and analyses the raw input to understand its content (e.g., are there images, texts, structures; what is the input about) and derive context.

For document understanding, the structured document 200 (e.g., the slides 206) are accessed by a document manager 402. The document manager 402 provides (e.g., sends or transmits) the slides 206 to one or more appropriate analyzers which will each apply a machine-trained model to analyze the document content of each slide 206. The analyzers include a text analyzer 404, a slide analyzer 406, and an image analyzer 408. In example embodiments, the text analyzer 404 analyzes each slide to determine content and context based on text on each slide. In some cases, the text analyzer 404 applies a machine-trained text analysis model that has been trained on previous data sets of text and corresponding context. In some embodiments, the text analyzer 404 may also use a natural language processor model.

The slide analyzer 406 is configured to understand the structure of each slide 206 including text boxes and identify different parts of each slide. For example, the slide analyzer 406 can identify text boxes, bullets, shape and locations of objects, graphs, or any other properties of each box within the slide 206. In some cases, the slide analyzer 406 applies a machine-trained slide analysis model that has been trained on previous data sets of slide structures.

The image analyzer 408 is configured to analyze each slide to understand image content. For example, the image analyzer 408 determines the presence of text boxes, identifies how many text boxes are in each slide, and/or whether an object is a table, graph, photo, or other type of object. In some cases, the image analyzer 408 also aligns an image with text in the document or recording presentation if there is an association. The alignment can help downstream tasks such as intelligent searching beyond simple text searches (e.g., searching for related images or diagrams). The image analyzer 408 also identifies whether an image is information content or just background. In some cases, the image analyzer 408 applies a machine-trained image analysis model that has been trained on previous data sets of images.

With respect to the audio track recording 208 and camera stream recording 210, these recordings are obtained by a recording manager 410. The recording manager 410 provides (e.g., sends or transmits) the audio track recording 208 to an audio analyzer 412 and provides the camera stream recording 210 to a video analyzer 414. Each of these analyzers applies a corresponding machine-trained model to analyze their respective recording. For example, the audio analyzer 412 may initially convert the speech in the audio track recording 208 to text to create a transcript. Ideally, the transcript presents the topics and key ideas of what the presenter wants to emphasize for each slide instead of all the text on it. The audio analysis can capture these key points of the slides.

The audio analyzer 412 also applies one or more audio analysis models (trained on a data set of previous speech) to understand the speech including vocal patterns (e.g., a pace) and an acoustic event (e.g., a cough). Thus, the audio analyzer 412 can understand emotions, know if there is background noise, and detect acoustic events and remove the acoustic event in various embodiments. In some cases, the audio analyzer 412 also applies a noise resolution model to optimize the audio track to make the presenter sound clear.

The video analyzer 414 is configured to analyze the camera stream recording 210 to understand, for example, facial expressions, eye gazes (e.g., where is the presenter looking at), and gestures. In example embodiments, the video analyzer 414 applies a video analysis model trained on a data set of previous camera stream recording. Thus, the video analyzer 414 can identify emotions and expressions and understand which parts of the recorded presentation are important and any gestures around these important parts.

Other device inputs 212 are analyzed by a recording operations analyzer 416. In example embodiments, the recording operations analyzer 416 uses one or more machine-trained models to analyze laser, mouse, or ink (e.g., pen) operations during the recorded presentation to find focus points. For example, the recording operations analyzer 416 can detect where a laser pointer is pointed, classify a mouse click/movement operation as informatic or non-informatic, or convert ink (e.g., anything written) to a text or formula. An understanding of where and when these other device input operations occur provides an understanding of key points (or focal points) during the recorded presentation. These key points are important and will likely be highlighted in summarization.

Because people have different styles, user preferences or histories may be used by the recording operations analyzer 416 and/or the video analyzer 414 in determining the key points. For example, if a user typically circles a key point in his presentation, the recording operations analyzer 416 will take that into consideration when performing its analysis or if the user normal performs a particular gesture when discussing a key point, the video analyzer 414 will consider this in its analysis.

Accordingly, using audio track analysis, camera stream analysis, and operations analysis, the analysis system 302 captures information such as, given a particular slide, which part is the presenter talking about (e.g., context), what are the highlights, and is there additional information besides the text that is presented in slide. Based on all this processing and analysis, the analysis system 302 obtains an understand/context, for each slide, of what is the key point(s).

Various outputs are generated from the analysis performed by the analysis system 302. For instance, based on document understanding derived from text, slide, and image analysis, a parsed document 418 is generated from the structured document. In various embodiments, the parsed document 418 identifies the various structures of the structured document (e.g., objects, images, bullets, text). Additionally, document understanding 420 from the analysis of the text, slides, and images is outputted. The document understanding 420 includes context of the structured document along with number and types of different objects. The output of the audio analyzer 412 is a transcript 422, while the output of the video analyzer 424 is camera stream understanding (e.g., emotions, expressions, understanding which part is important, and any gestures around these important parts). Finally, the output of the recording operations analyzer 416 is a recording operation understanding which provides an understanding of key points (or focal points) during the recorded presentation based on where and when the other operations (e.g., mouse or laser movement) occurred during the recorded presentation. All of these outputs are then provided to the next stage of the presentation processing system 300.

Figure 5:
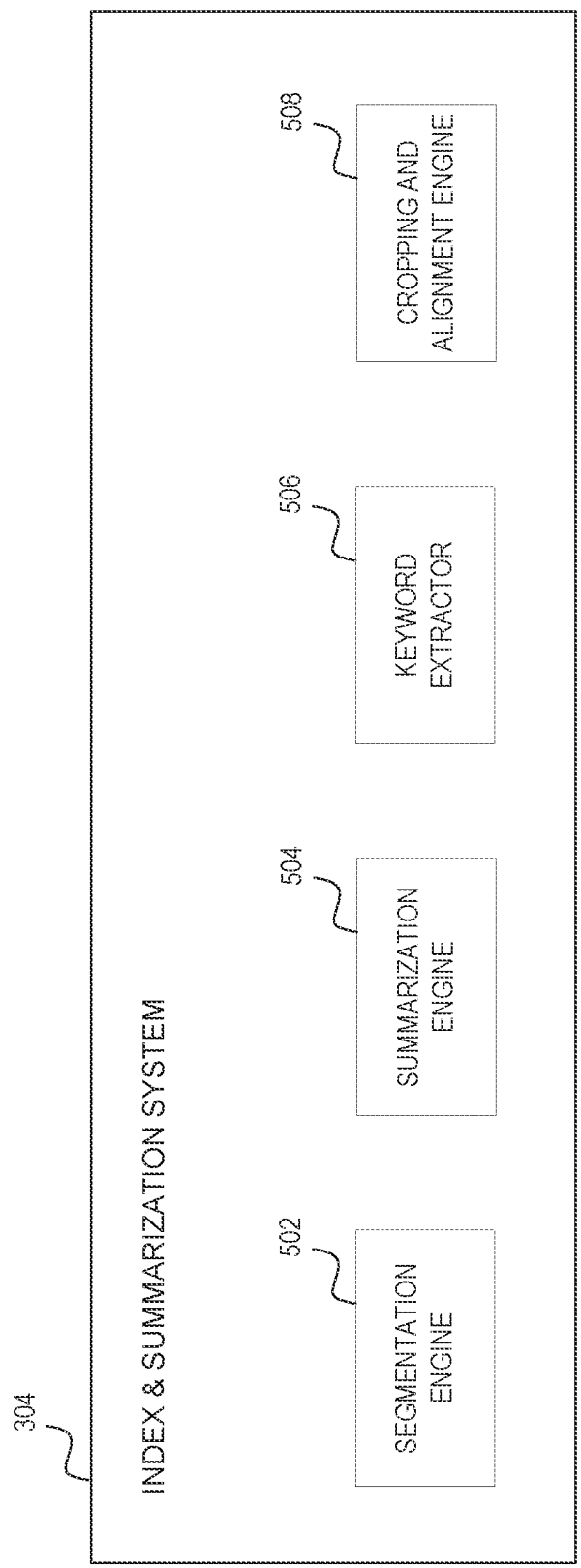
FIG. 5 is a block diagram illustrating components of an index and summarization system of the presentation processing system, according to some example embodiments.

FIG. 5 is a block diagram illustrating components of the index and summarization system 304, according to some example embodiments. The index and summarization system 304 comprises the second stage of the presentation processing system 300. This second stage takes the outputs from the analysis system 302 performs segmentation, summarization, keyword extraction, and cropping and alignment. As such, the index and summarization system 304 comprises a segmentation engine 502, a summarization engine 504, a keyword extractor 506, and a cropping and alignment engine 508. In example embodiments, the index and summarization system 304 jointly aligns all the information extracted and learned by the analysis system 302 by the same timeline. Then, a next machine learning layer provided by the components of the index and summarization system 304 is added to analyze these signals jointly.

In example embodiments, the segmentation engine 502 uses the segmentation signals (from the text, slide, and image analysis) within the structured document together with the speech, video, and operations analysis to do smart segmentation of the recorded presentation. That is, the segmentation engine 502 takes all the inputs and decides how to break up the recorded presentation into segments. In one example, the recorded presentation can be segmented by topic. In some cases, the segmentation engine 502 can segment the recorded presentation by key points e.g., same topic but with different key points). In various embodiments, the segmentation engine 502 applies a segmentation model trained on, for example, a dataset of segmentation signals and previous speech, video, and operations analysis outputs. In one embodiment, the model can segment the recorded presentation based on the transcript. For example, the presenter may verbally transition from a first segment to a second segment (e.g., "moving on to the next topic."). The segments may be indexed by the segmentation engine 502 for later use.

The summarization engine 504 applies summarization techniques to each section (e.g., segment) to generate a short summary for each segment and/or for the overall recorded presentation. For example, for each segment, the summarization engine 504 generates one or two sentences to describe what each segment is about. The short summary may comprise, for example, the key points derived by the analysis system 302 (e.g., focal points; text or images that received more discussion time; objects that were highlighted during the presentation). In some embodiments, the summarization engine 504 applies a summarization model that is trained on previous recorded presentations. In some cases, the summarization engine 504 determines one or more portions of the recorded presentation that can be cropped (e.g., by the cropping and alignment engine 508) and used to summarize the recorded presentation.

The keyword extractor 506 applies keyword extraction techniques to extract keywords for each segment and for the overall recording. For example, keywords associated with focal points or topics may be extracted. Here to, the keyword extractor 506 may apply a model (e.g., a keyword extraction model) trained with data from previous recorded presentations.

The cropping and alignment engine 508 crops the recorded presentation by segments (e.g., determines where borders for each segment) and aligns the sections of the structured document with the different recording streams according to a corresponding segment. The cropping and alignment engine 508 also crops and aligns the segments with summarization and keywords. Further still, for a summarization, a short video that represents the recorded presentation is needed. Thus, the cropping and alignment engine 508 crops out the short video and the section from the structured document and aligns them with each other.

Figure 6:
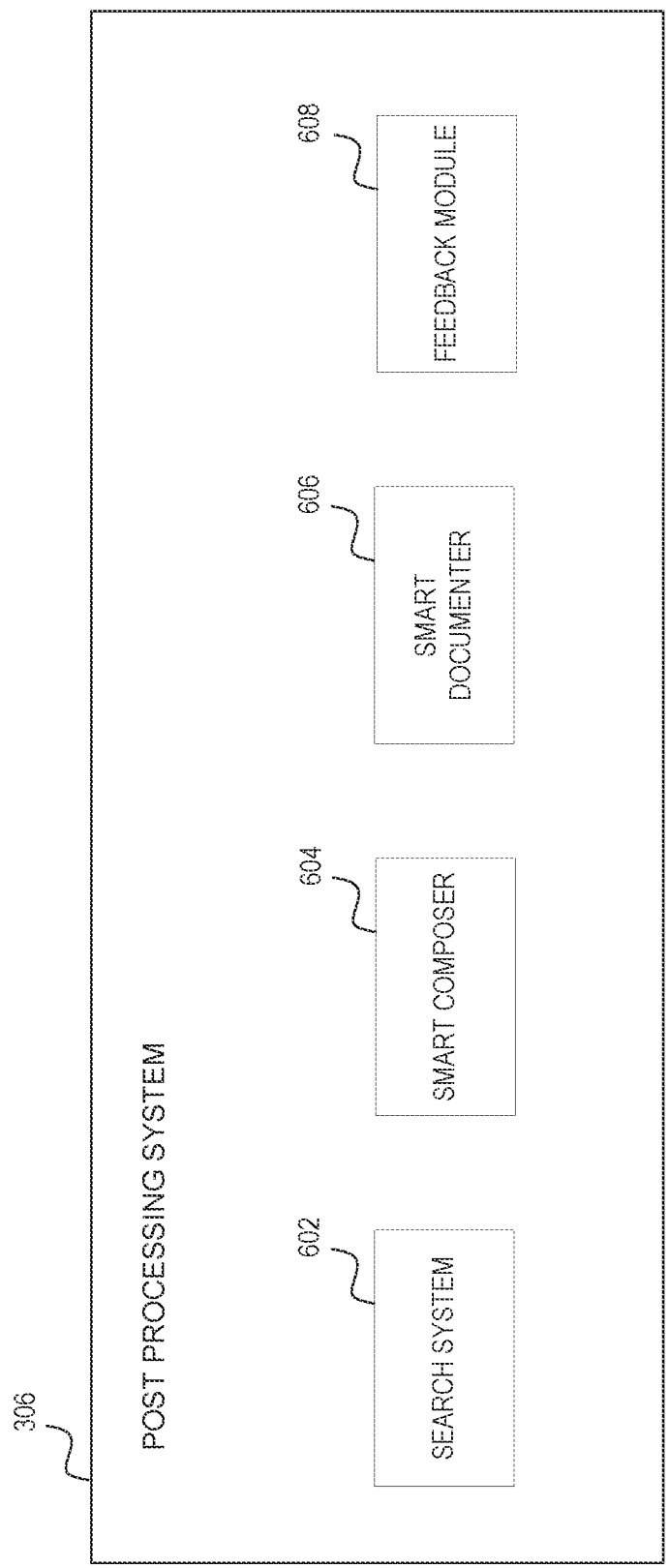
FIG. 6 is a block diagram illustrating components of a post-processing system of the presentation processing system, according to some example embodiments.

The segmentation, summarization, keywords, and cropped/aligned segments are then provided to the post-processing system 306 for the last stage of the presentation processing system 300. The last stage leverages all the information, understanding, summarization, segmentations, and so forth to help users efficiently access specific information in the recorded presentation. FIG. 6 is a block diagram illustrating components of the post-processing system 306, according to some example embodiments. The post-processing system 306 comprises a search system 602, a smart composer 604, a smart documenter 606, and a feedback module 608. The post-processing system 306 can comprise other systems, components, or applications that make use of the analyzed information and segmented recorded presentation.

The search system 602 is configured to provide search capability to find corresponding segments, document pages, slides, and highlights instead of having to view an entire recorded presentation or fast forward through the recorded presentation. In some embodiments, the search system 602 supports more intelligent searches such as finding an answer to a question (e.g., search a recording of a lecture for an answer). Additionally, the search system 602 can suggest search terms.

The smart composer 604 is configured to compose emails or posts that allow sharing of the structure document and recorded presentation with others. In some embodiments, the smart composer 604 uses natural language generation (NLG) models to compose the email or post with high-level summarization and cropped recording/document pages/slides (or links to these recordings, pages, and/or slides) for users to share easily.

The smart documenter 606 generates summaries for documentation. In example embodiments, the smart documenter 606 converts the structured document with the recorded presentation to a summary format for documentation purposes (e.g., to a shorter format). For example, for a long recording, the smart documenter 606 may provide a 30 second clip that describes the high-level topics that the presentation is about. In some cases, the smart documenter 606 converts the structured document to a Wiki-type page that is searchable and can find/link to a corresponding recorded presentation, segment of the recorded presentation, and/or corresponding document page(s)/slide(s) with highlights.

The feedback module 608 obtains user feedback, ratings, and interactions with the summarized format from users and provides the feedback to the machine training system 114 to further improve the machine learning pipeline. For example, if the feedback is generally negative, the feedback can be used to refine one or more models associated with the negative feedback.

Figure 7:
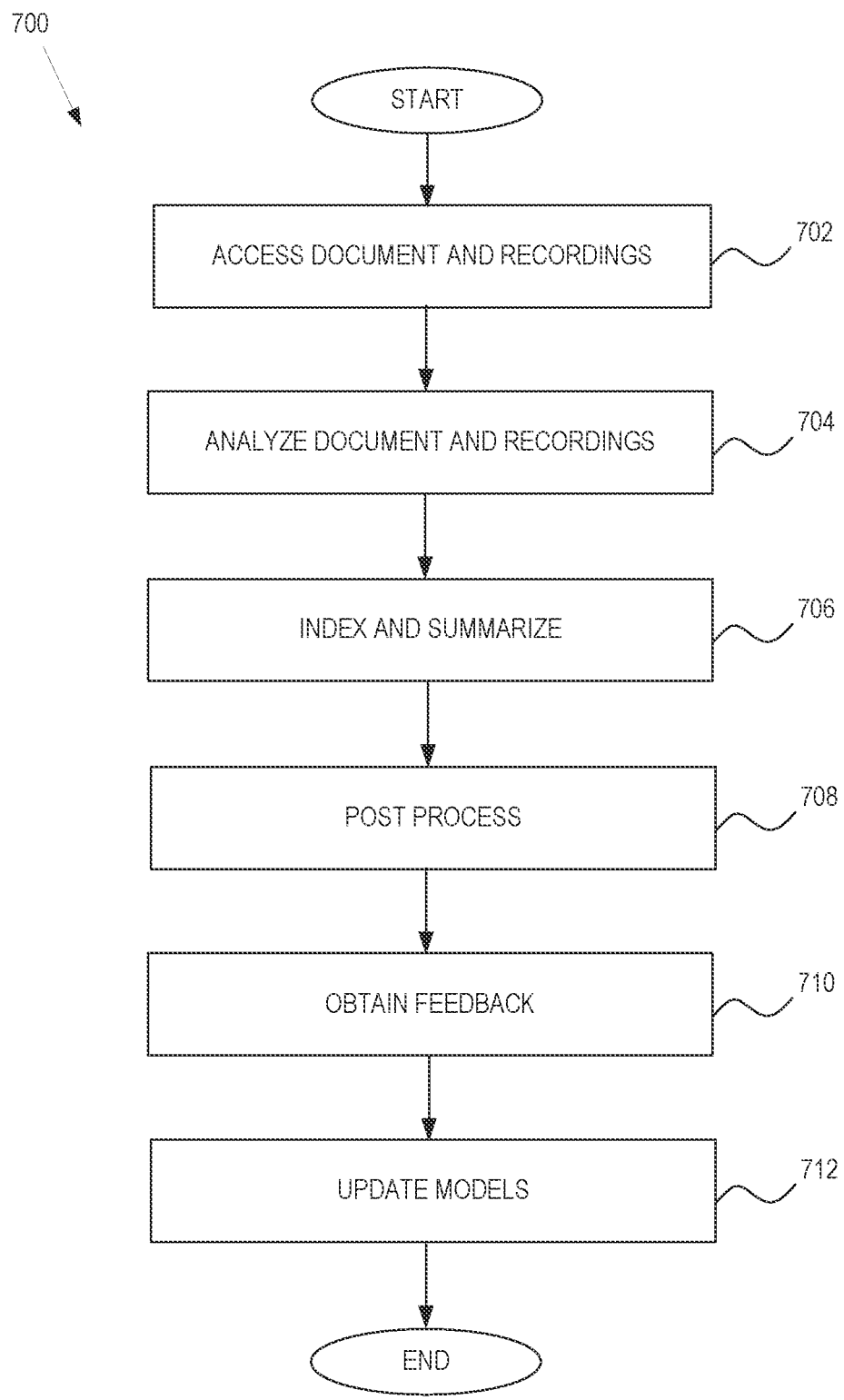
FIG. 7 is a flowchart illustrating operations of a method for providing smart summarization, indexing, and post-processing of recorded document presentations, according to some example embodiments.

FIG. 7 is a flowchart illustrating operations of a method 700 for providing smart summarization, indexing, and post-processing of recorded document presentations, according to some example embodiments. Operations in the method 700 may be performed by the presentation processing system 300, using components described above with respect to FIG. 3 to FIG. 6. Accordingly, the method 700 is described by way of example with reference to the presentation processing system 300. However, it shall be appreciated that at least some of the operations of the method 700 may be deployed on various other hardware configurations or be performed by similar components residing elsewhere in the network environment 100. Therefore, the method 700 is not intended to be limited to the presentation processing system 300.

In operation 702, the analysis system 302 accesses the structured document 200 and recordings 202. The recordings include audio track recordings 208, camera stream recordings 210, and other device input recording(s) 212.

In operation 704, the analysis system 302 analyzes the structured document 200 and recordings 202. In example embodiments, the analysis system 302 performs text analysis, slide (or page) analysis, and/or image analysis of the structured document. Additionally, the analysis system 302 analyzes the audio track recording 208 to generate a transcript and analyzes the camera stream recording 210 to derive camera stream understanding associated with the recorded presentation. Furthermore, the analysis system 302 analyzes other device/operation recordings to derive further understanding of the recorded presentation. The output of operation 704 can include a parsed structured document, document understanding, the transcript, the camera stream understanding, and recording operation understanding. These outputs are then provided to the index and summarization system 304.

In operation 706, the index and summarization system 304 indexes and summarizes the recorded presentation including the structured document. The index and summarization system 304 uses the outputs of the analysis system 302 and segments the recorded presentation, generates a short summary for each segment as well as for the entire recorded presentation, extracts keywords for the segments and/or recorded presentation, and crops and aligns the segments of the recorded presentation.

In operation 708, the post-processing system 306 performs post-processing by consuming the indexing and summarization to build or support applications such as smart document recording search, email or post composition (e.g., using templates) to share the processes recorded presentation, or searchable documentation for the recorded presentation.

In operation 710, the feedback module 608 of the post-processing system 306 obtains feedback, ratings, and interaction indications (collectively referred to as "feedback"). The feedback along with the summarized format can be provided to the machine training system 118. For example, feedback that indicates that a model is not accurate can be provided to the machine training system 118. In operation 712, the machine training system 118 uses the feedback to update the model.

Figure 8:
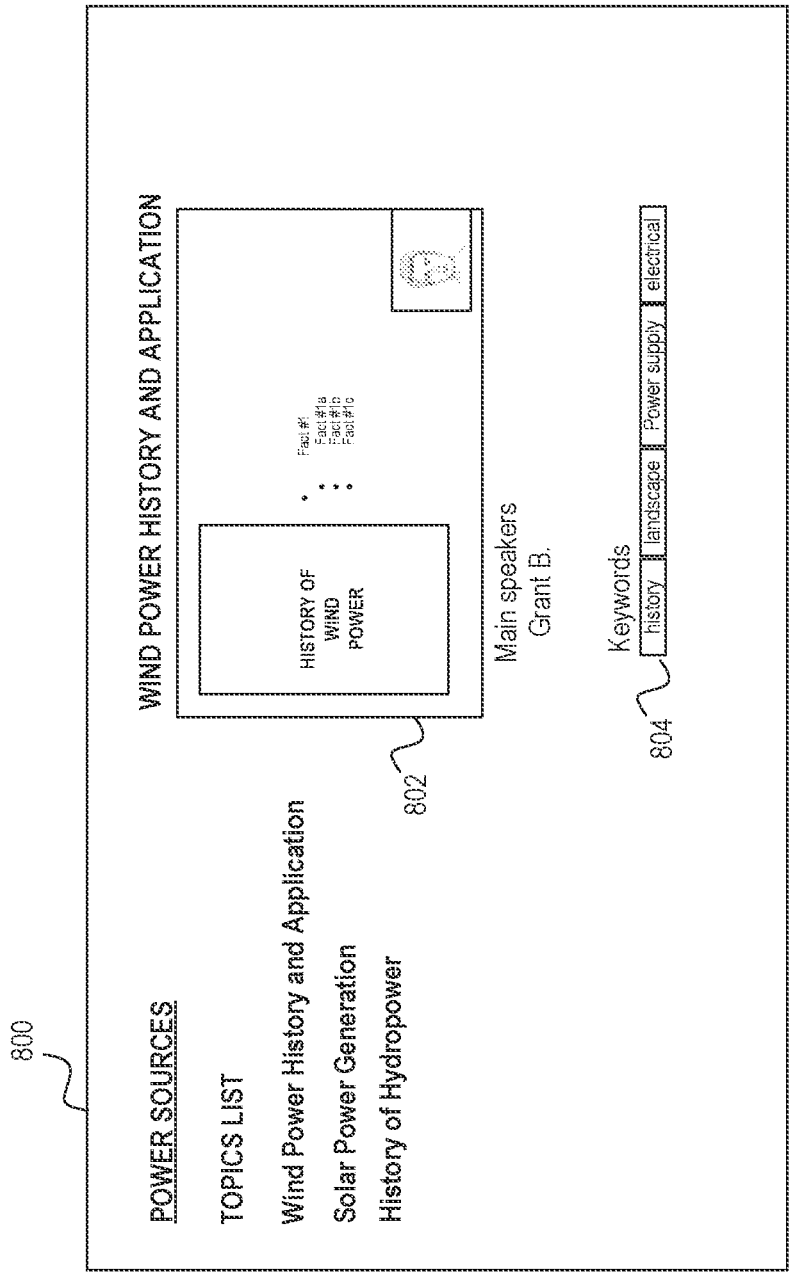
FIG. 8 is a screenshot of a portal displaying an example recorded presentation processed by the presentation processing system, according to some example embodiments.

FIG. 8 is a screenshot of an example portal 800 that presents a recorded presentation 802 processed by the presentation processing system 300, according to some example embodiments. Here, the recorded presentation 802 is segmented into three segments (e.g., topics). For example, the three segments are wind power history and application, solar power generation, and history of hydropower. The portal 800 provides summarization of the recorded presentation by topic (e.g., topics list), speaker (e.g., Grant B.), and keywords 804. In one embodiment, when a user plays the recorded presentation, an indication of the speaker(s) and keywords 802 are shown below the recorded presentation 802. Clicking on a keyword takes the user to the portion (e.g., segment or a portion within the segment) in the recorded presentation where the keyword was mentioned.

While example embodiments discuss examples whereby the structured document is a slide presentation, alternative embodiments can use structured documents that are word processing documents, spreadsheet documents, and other document software as long as there is a corresponding recording.

Figure 9:
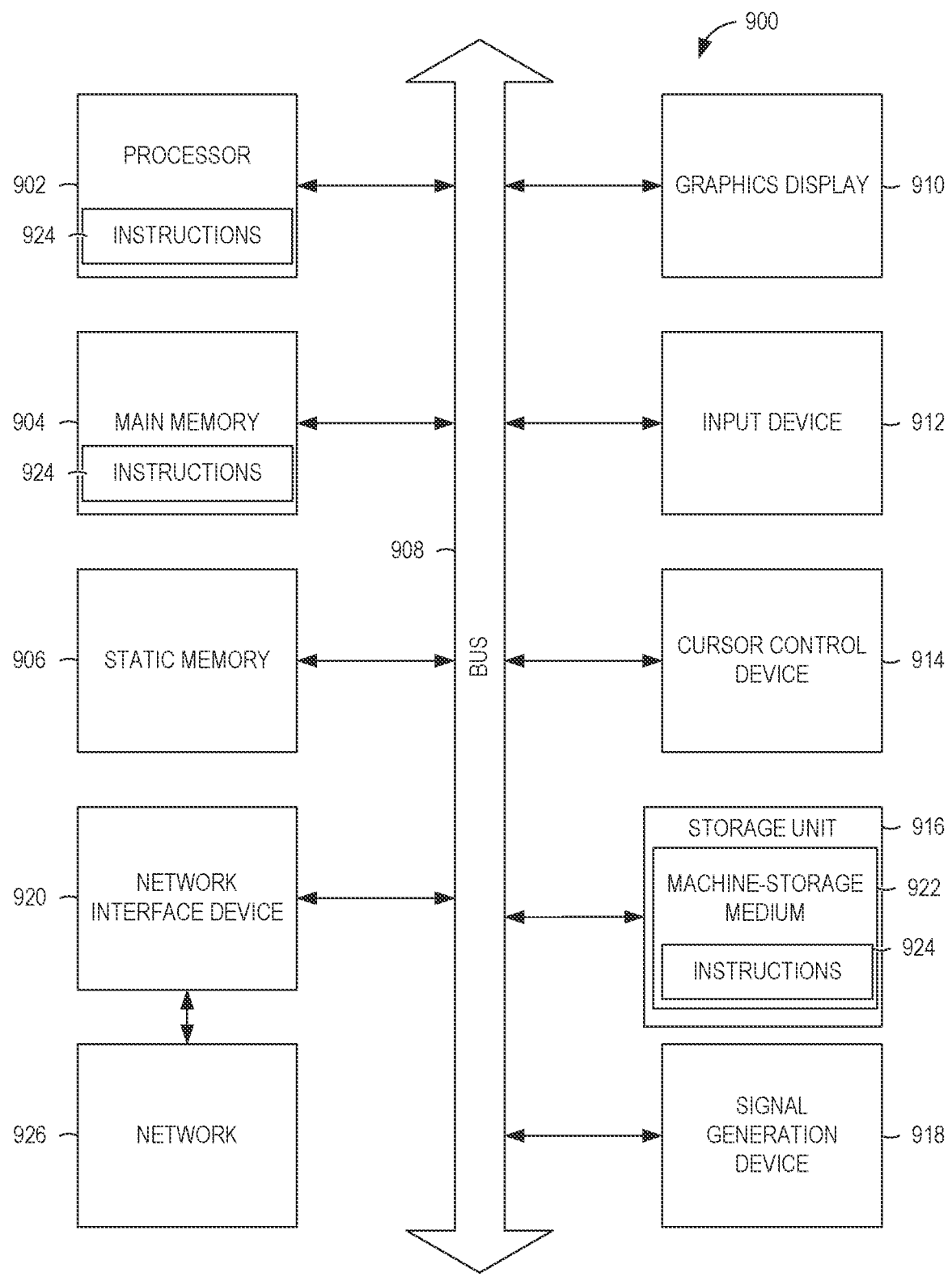
FIG. 9 is a block diagram illustrating components of a machine, according to some example embodiments, able to read instructions from a machine-storage medium and perform any one or more of the methodologies discussed herein.

FIG. 9 illustrates components of a machine 900, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 9 shows a diagrammatic representation of the machine 900 in the example form of a computer device (e.g., a computer) and within which instructions 924 (e.g., software, a program, an application, an applet, an app, or other executable code) for causing the machine 900 to perform any one or more of the methodologies discussed herein may be executed, in whole or in part.

For example, the instructions 924 may cause the machine 900 to execute the flow diagram of FIG. 7. In one embodiment, the instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, or a cathode ray tube (CRT), or any other display capable of displaying graphics or video). The machine 900 may also include an input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a sound card, an amplifier, a speaker, a headphone jack, or any suitable combination thereof), and a network interface device 920.

The storage unit 916 includes a machine-storage medium 922 (e.g., a tangible machine-storage medium) on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, before or during execution thereof by the machine 900, Accordingly, the main memory 904 and the processor 902 may be considered as machine-readable media (e.g., tangible and non-transitory machine-readable media). The instructions 924 may be transmitted or received over a network 926 via the network interface device 920.

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 922 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communications network 926 using a transmission medium via the network interface device 920 and utilizing any one of a number of well-known transfer protocols (e.g., HTTP). Examples of communication networks 926 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms.

Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for summarization, indexing, and post-processing of a recorded document presentation. The method comprises accessing, by a presentation processing system, a structured document, audio and video recordings associated with a recorded presentation given using the structured document, and a recording of operations performed during the recorded presentation; analyzing, using machine-trained models associated with the presentation processing system, the structured document, audio and video recordings, and recording of operations performed during the presentation, the analyzing comprising generating a transcript of the audio recording, determining context of components of the structured document, and deriving context from the video recordings and recording of operations; and based on the analyzing, segmenting the recorded presentation into a plurality of segments, and generating an index of the plurality of segments.

In example 2, the subject matter of example 1 can optionally include based on the analyzing, cropping and aligning segments of the recorded presentation with summarization and keywords.

In example 3, the subject matter of any of examples 1-2 can optionally include based on the analyzing, generating a summarization for the recorded presentation, the summarization comprising focal points of the recorded presentation.

In example 4, the subject matter of any of examples 1-3 can optionally include wherein the summarization includes one or more sections cropped from the recorded presentation.

In example 5, the subject matter of any of examples 1-4 can optionally include based on the analyzing, extracting keywords from the structured document, the keywords being aligned with one or more of the plurality of segments.

In example 6, the subject matter of any of examples 1-5 can optionally include using the plurality of segments and the index, providing a search engine that searches for a segment of the recorded presentation of the plurality of segments and presents the segment of the recorded presentation.

In example 7, the subject matter of any of examples 1-6 can optionally include based on the plurality of segments and the index, generating a documentation page that summarizes the recorded presentation and provides links to one or more segments of the recorded presentation.

In example 8, the subject matter of any of examples 1-7 can optionally include causing presentation a portal, the portal comprising a display portion that displays the recorded presentation, a segment portion that displays a list of the segments of the recorded presentation, and a keyword portion that displays keywords extracted from the recorded presentation.

In example 9, the subject matter of any of examples 1-8 can optionally include receiving a selection of a keyword from the keyword portion; and in response to receiving the selection, navigating the recorded presentation to a segment of the recorded presentation linked to the selected keyword.

In example 10, the subject matter of any of examples 1-9 can optionally include wherein the recording of operations comprises a recording of one or more of mouse movements, mouse clicks, laser pointer indications, or pen movement by a presenter during the recorded presentation.

In example 11, the subject matter of any of examples 1-10 can optionally include based on the analyzing, composing an email or post that provides a summarization of the recorded presentation and links to one or more segments of the recorded presentation.

Example 12 is a system for summarization, indexing, and post-processing of a recorded document presentation. The system comprises one or more hardware processors and a memory storing instructions that, when executed by the one or more hardware processors, cause the one or more hardware processors to perform operations comprising accessing a structured document, audio and video recordings associated with a recorded presentation given using the structured document, and a recording of operations performed during the recorded presentation; analyzing, using machine-trained models, the structured document, audio and video recordings, and recording of operations performed during the presentation, the analyzing comprising generating a transcript of the audio recording, determining context of components of the structured document, and deriving context from the video recordings and recording of operations; and based on the analyzing, segmenting the recorded presentation into a plurality of segments, and generating an index of the plurality of segments.

In example 13, the subject matter of example 12 can optionally include wherein the operations further comprise, based on the analyzing, cropping and aligning segments of the recorded presentation with summarization and keywords.

In example 14, the subject matter of any of examples 12-13 can optionally include wherein the operations further comprise, based on the analyzing, generating a summarization for the recorded presentation, the summarization comprising focal points of the recorded presentation and including one or more sections cropped from the recorded presentation.

In example 15, the subject matter of any of examples 12-14 can optionally include wherein the operations further comprise, based on the analyzing, extracting keywords from the structured document, the keywords being aligned with one or more of the plurality of segments.

In example 16, the subject matter of any of examples 12-15 can optionally include wherein the operations further comprise, using the plurality of segments and the index, providing a search engine that searches for a segment of the recorded presentation of the plurality of segments and presents the segment of the recorded presentation.

In example 17, the subject matter of any of examples 12-16 can optionally include wherein the operations further comprise, based on the plurality of segments and the index, generating a documentation page that summarizes the recorded presentation and provides links to one or more segments of the recorded presentation.

In example 18, the subject matter of any of examples 12-17 can optionally include wherein the operations further comprise causing presentation a portal, the portal comprising a display portion that displays the recorded presentation, a segment portion that displays a list of the segments of the recorded presentation, and a keyword portion that displays keywords extracted from the recorded presentation.

In example 19, the subject matter of any of examples 12-18 can optionally include wherein the operations further comprise, based on the analyzing, composing an email or post that provides a summarization of the recorded presentation and links to one or more segments of the recorded presentation.

Example 20 is a computer-storage medium comprising instructions which, when executed by one or more hardware processors of a machine, cause the machine to perform operations for summarization, indexing, and post-processing of a recorded document presentation. The operations comprises accessing a structured document, audio and video recordings associated with a recorded presentation given using the structured document, and a recording of operations performed during the recorded presentation; analyzing, using machine-trained models, the structured document, audio and video recordings, and recording of operations performed during the presentation, the analyzing comprising generating a transcript of the audio recording, determining context of components of the structured document, and deriving context from the video recordings and recording of operations; and based on the analyzing, segmenting the recorded presentation into a plurality of segments, and generating an index of the plurality of segments.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
accessing, by a presentation processing system, a structured document, audio and video recordings associated with a recorded presentation given using the structured document, and a recording of device operations and movements performed by a presenter during the recorded presentation;
analyzing, using one or more machine-trained models, the structured document, the audio and video recordings, and the recording of device operations and movements performed by the presenter during the presentation to determine keywords and focal points of the recorded presentation;
segmenting the recorded presentation into a plurality of segments based at least in part on the determined focal points; and
causing presentation of a portal that provides a summarization of the recorded presentation, the portal comprising a display portion that displays the recorded presentation, a segment portion that displays a list of the plurality of segments of the recorded presentation, and a keyword portion that displays the keywords extracted from the recorded presentation, selection of a keyword causing display of a corresponding segment of the plurality of segments, the portal being accessible via message.

2. The method of claim 1, further comprising:
receiving a selection of a keyword from the keyword portion; and
in response to receiving the selection of the keywork, navigating the recorded presentation to a segment of the recorded presentation associated with the selected keyword.

3. The method of claim 1, wherein the message comprises an email or a post having a link, activation of the link causing the presentation of the portal.

4. The method of claim 1, wherein the analyzing comprises:
generating a transcript of the audio recording;
determining context of components of the structured document; and
deriving context from the video recordings and recording of operations.

5. The method of claim 1, wherein the segmenting the recorded presentation into the plurality of segments comprises cropping and aligning segments of the recorded presentation with the keywords.

6. The method of claim 1, further comprising:
based on the analyzing, generating the summarization for the recorded presentation, the summarization comprising the focal points of the recorded presentation.

7. The method of claim 1, further comprising:
based on the analyzing, generating a summary for each segment of the plurality of segments.

8. The method of claim 1, wherein the analyzing comprises extracting the keywords from the structured document, the keywords being aligned with one or more of the plurality of segments.

9. The method of claim 1, further comprising:
using the plurality of segments and an index, providing a search engine that searches for and presents a segment of the plurality of segments.

10. The method of claim 1, further comprising:
based on the plurality of segments and an index, generating a documentation page that summarizes the recorded presentation and provides links to one or more segments of the recorded presentation.

11. The method of claim 1, wherein the recording of device operations and movements comprises a recording of one or more of mouse movements, mouse clicks, laser pointer indications, or pen movement by the presenter during the recorded presentation.

12. A system comprising:
one or more hardware processors; and
a memory storing instructions that, when executed by the one or more hardware processors, cause the one or more hardware processors to perform operations comprising:
accessing, by a presentation processing system, a structured document, audio and video recordings associated with a recorded presentation given using the structured document, and a recording of device operations and movements performed by a presenter during the recorded presentation;
analyzing, using one or more machine-trained models, the structured document, the audio and video recordings, and the recording of device operations and movements performed by the presenter during the presentation to determine keywords and focal points of the recorded presentation;
segmenting the recorded presentation into a plurality of segments based at least in part on the determined focal points; and
causing presentation of a portal that provides a summarization of the recorded presentation, the portal comprising a display portion that displays the recorded presentation, a segment portion that displays a list of the plurality of segments of the recorded presentation, and a keyword portion that displays the keywords extracted from the recorded presentation, selection of a keyword causing display of a corresponding segment of the plurality of segments, the portal being accessible via a message.

13. The system of claim 12, wherein the operations further comprise:
receiving a selection of a keyword from the keyword portion; and
in response to receiving the selection of the keyword, navigating the recorded presentation to a segment of the recorded presentation associated with the selected keyword.

14. The system of claim 12, wherein the segmenting the recorded presentation into the plurality of segments comprises cropping and aligning segments of the recorded presentation with the keywords.

15. The system of claim 12, wherein the operations further comprise:
based on the analyzing, generating the summarization for the recorded presentation, the summarization comprising the focal points of the recorded presentation.

16. The system of claim 12, wherein the operations further comprise:
based on the analyzing, generating a summary for each segment of the plurality of segments.

17. The system of claim 12, wherein the analyzing comprises extracting the keywords from the structured document, the keywords being aligned with one or more of the plurality of segments.

18. The system of claim 12, wherein the operations further comprise:
using the plurality of segments and an index, providing a search engine that searches for and presents a segment of the plurality of segments.

19. The system of claim 12, wherein the operations further comprise:
based on the plurality of segments and an index, generating a documentation page that summarizes the recorded presentation and provides links to one or more segments of the recorded presentation.

20. A computer-storage medium storing instructions which, when executed by one or more hardware processors of a machine, cause the machine to perform operations comprising:
accessing, by a presentation processing system, a structured document, audio and video recordings associated with a recorded presentation given using the structured document, and a recording of device operations and movements performed by a presenter during the recorded presentation;
analyzing, using one or more machine-trained models, the structured document, the audio and video recordings, and the recording of device operations and movements performed by the presenter during the presentation to determine keywords and focal points of the recorded presentation;
segmenting the recorded presentation into a plurality of segments based at least in part on the determined focal points; and
causing presentation of a portal that provides a summarization of the recorded presentation, the portal comprising a display portion that displays the recorded presentation, a segment portion that displays a list of the plurality of segments of the recorded presentation, and a keyword portion that displays the keywords extracted from the recorded presentation, selection of a keyword causing display of a corresponding segment of the plurality of segments, the portal being accessible via a message.

* * * * *